(12) United States Patent
Wu

(10) Patent No.: US 7,791,285 B2
(45) Date of Patent: Sep. 7, 2010

(54) HIGH EFFICIENCY AC LED DRIVER CIRCUIT

(75) Inventor: Yifeng Wu, Goleta, CA (US)

(73) Assignee: Cree, Inc., Durham, NC (US)

( * ) Notice: Subject to any disclaimer, the term of this patent is extended or adjusted under 35 U.S.C. 154(b) by 808 days.

(21) Appl. No.: 11/786,907

(22) Filed: Apr. 13, 2007

(65) Prior Publication Data

US 2008/0252229 A1  Oct. 16, 2008

(51) Int. Cl.
*H05B 37/00* (2006.01)
(52) U.S. Cl. .................................. 315/227 R
(58) Field of Classification Search .......... 315/186, 315/187, 188, 200 R, 224, 227 R
See application file for complete search history.

(56) References Cited

U.S. PATENT DOCUMENTS

| 7,265,496 | B2 * | 9/2007 | Allen | 315/185 R |
|---|---|---|---|---|
| 7,344,275 | B2 * | 3/2008 | Allen et al. | 362/249.01 |
| 7,408,308 | B2 * | 8/2008 | Sawada et al. | 315/291 |
| 2003/0234342 | A1 | 12/2003 | Gaines et al. | |
| 2004/0245946 | A1 | 12/2004 | Halter | |
| 2005/0012457 | A1 | 1/2005 | Wu | |
| 2006/0022214 | A1 | 2/2006 | Morgan et al. | |
| 2007/0139316 | A1 | 6/2007 | Hyatt | |

FOREIGN PATENT DOCUMENTS

WO    WO2004068909    8/2004

OTHER PUBLICATIONS

Office Action from related U.S. Appl. No. 10/977,165. Dated: Feb. 2, 2010.
Third Office Action from related Chinese Application No. 200380110037.X. Dated: Oct. 9, 2009.
From related Chinese Application No. 200380110037.X dated Feb. 12, 2010—Decision on Rejection.
LEDs Magazine, May 2006, "Running LEDs From an AC Supply". pp. 1-5.
Related PCT International Search Report and Written Opinion, PCT/US2008/008528, dated: Jul. 16, 2009.
Related Office Action from Taiwan Patent Application No. 092137492, dated May 25, 2009.
Related Official Notice of final Decision of Rejection, dated Nov. 4, 2008, re Japanese Patent Application No. 2004-565759.
Patent Abstracts of Japan, Publication No. 10-340978, Dated: Dec. 22, 1998.
Patent Abstracts of Japan, Publication No. 200-091381, Dated: Mar. 31, 2000.
Patent Abstracts of Japan, Publication No. 2001-358442, Dated: Dec. 26, 2001.

* cited by examiner

*Primary Examiner*—Douglas W Owens
*Assistant Examiner*—Minh D A
(74) *Attorney, Agent, or Firm*—Koppel Patrick, Heybl & Dawson

(57) ABSTRACT

In an AC drive circuit for LEDs, a current limiting capacitor connects to an AC source, a first circuit portion, including a first rectifying diode and a first power capacitor, connects between the current limiting capacitor and the source and a second circuit portion, including a second rectifying diode in series with a second power capacitor, is in parallel with the first circuit portion. A first LED is in the first circuit portion in parallel with the first power capacitor, while a second LED in the second circuit portion is in parallel with the second power capacitor. During positive half cycles, the first rectifying diode charges the first power capacitor and drives the first LED. During negative half cycles, the second rectifying diode charges the second power capacitor and drives the second LED.

30 Claims, 1 Drawing Sheet

HIGH EFFICIENCY AC LED DRIVER CIRCUIT

BACKGROUND OF THE INVENTION

1. Field of the Invention

This invention relates to light emitting diodes (LEDs) and more particularly to electronic circuitry for providing power to LEDs from alternating current sources.

2. Description of Related Art

The many potential advantages of LEDs as a light source, compared to incandescent bulbs, may soon make LEDs viable as replacements for most applications currently using incandescents. LEDs are being developed with increasing amounts of light output—some currently available can provide about the same amount of illumination as a conventional 60 watt light bulb. LEDs are also relatively efficient with recent LED prototypes being demonstrated with a white light efficiency of 131 lumens per watt, while consuming only 20 mA of power.

Moreover, improvements have been made in the color of the light produced by LEDs, and LEDs also have great advantages over incandescent bulbs with respect to longevity, since some LEDs can last for approximately 100,000 hours. The current installed cost for LED lighting, however, is much greater, although the cost of LED lighting will no doubt eventually be competitive with incandescent lighting.

Another issue with LED lighting concerns the electrical circuitry necessary to power an LED. Unlike an incandescent bulb which operates equally well regardless of the polarity of the electric current applied to it, an LED generates light only when a voltage source is applied with a positive electrical polarity, i.e., when the LED is forward biased. Since an LED is a diode, the voltage applied across the LED is logarithmically related to the current. Hence the power can be considered generally proportional to the current, and the power supply for an LED should thus be a current source, to keep the power constant.

For low power applications requiring only a small number of LEDs, such as in mobile telephones, for example, the necessary direct current (DC) power can be readily supplied by a battery source. The need for a direct current (DC) source can cause problems, however, for applications requiring high amounts of light output, such as lighting for buildings.

One current practice is to use a linear or switching power supply to convert alternating current (AC) power to DC constant current. Such power supplies, however, require bulky components, such as transformers, inductors and capacitors. This can eliminate LEDs as a lighting choice where space is limited. In addition, the complexity of the conversion from AC to DC inherently introduces power losses.

Moreover, if the DC power is transmitted over a distance, system complexity and cost is typically increased. For these reasons, it is desirable to drive LED lighting directly from an AC source of power. Among other desirable features of AC is that the voltage can be readily stepped up or down using a transformer. An AC powered LED, however, will operate only during the positive voltage portion of the power cycle, causing the LED to turn on and off with the frequency of the AC supply.

BRIEF SUMMARY OF THE INVENTION

One embodiment of an alternating current drive circuit for supplying power to a light emitting diode according to the present invention generally comprising a first circuit portion connected to a source of alternating current. The first circuit portion including a first diode connected to a first capacitor. A second circuit portion is connected in parallel with the first circuit portion and to the source of alternating current, the second circuit portion including a second diode connected to a second capacitor. The light emitting diode is connected between the first circuit portion and the second circuit portion.

Another embodiment of an alternating current drive circuit for supplying power to a plurality of light emitting diodes according to the present invention comprises a current limiting capacitor for connection to the first terminal of a source of alternating current. A first circuit portion connected between the current limiting capacitor and the second terminal of the source of alternating current. The first circuit portion includes a first rectifying diode connected in series with a first power capacitor. A second circuit portion is connected, in parallel with the first circuit portion, between the current limiting capacitor and the second terminal of the source of alternating current. The second circuit portion includes a second rectifying diode connected in series with a second power capacitor. The plurality of light emitting diodes are connected between the first circuit portion and the second circuit portion.

An embodiment of an alternating current drive circuit for supplying power to first and second light emitting diodes according to the present invention comprises a first circuit portion connected to the source of alternating current, the first circuit portion including a first diode connected with a first capacitor. A second circuit portion is connected, in parallel with the first circuit portion, to the source of alternating current, the second circuit portion including a second diode connected with a second capacitor. The first light emitting diode is connected in the first circuit portion and in parallel with the first capacitor. The second light emitting diode is connected, with opposite polarity to the first light emitting diode, in the second circuit portion and in parallel with the second capacitor.

An embodiment of an alternating current drive circuit for supplying power to first and second pluralities of light emitting diodes according to the present invention comprises a current limiting capacitor for connection to the first terminal of a source of alternating current. A first circuit portion is connected between the current limiting capacitor and the second terminal of the source of alternating current, the first circuit portion including a first rectifying diode connected in series with a first power capacitor. A second circuit portion is connected, in parallel with the first circuit portion, between the current limiting capacitor and the second terminal of the source of alternating current, the second circuit portion including a second rectifying diode connected in series with a second power capacitor. The first plurality of light emitting diodes is connected in the first circuit portion and in parallel with the first power capacitor, and the second plurality of light emitting diodes being connected, with opposite polarity to the first light emitting diode, in the second circuit portion and in parallel with the second power capacitor.

These and other aspects and advantages of the invention will become apparent from the following detailed description and the accompanying drawings, which illustrate by way of example the features of the invention.

DETAILED DESCRIPTION OF THE INVENTION

Figure 1:
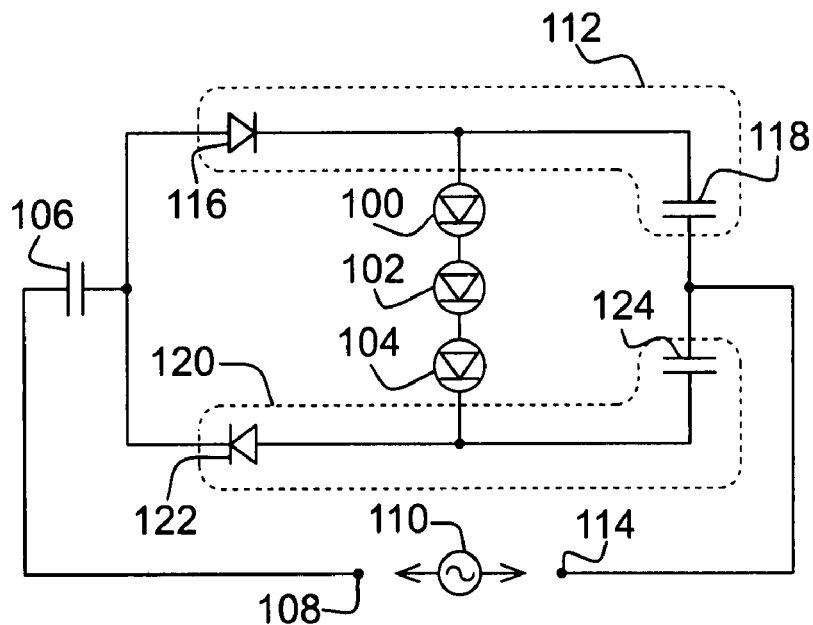
FIG. 1 is a schematic diagram of an alternating current drive circuit, constructed according to one embodiment of the invention, for supplying power to light emitting diodes.

The present invention generally provides new techniques and driver circuits for powering light emitting diodes from an AC source of power. The drive circuits of the present invention significantly improve the potential for use of LEDs as a lighting source, by improving efficiency, eliminating flicker, and offering the flexibility of straightforward scalability.

In one embodiment, an alternating current drive circuit for supplying power to a light emitting diode includes a current limiting capacitor for connection to the first terminal of a source of alternating current, a first circuit portion connected between the current limiting capacitor and the second terminal of the source of alternating current, the first circuit portion including a first rectifying diode connected in series with a first power capacitor, and a second circuit portion connected, in parallel with the first circuit portion, between the current limiting capacitor and the second terminal of the source of alternating current, the second circuit portion including a second rectifying diode connected in series with a second power capacitor.

The light emitting diode is connected between the first circuit portion and the second circuit portion, with the first and second rectifying diodes connected with opposite polarity such that, during each positive half cycle in the current source, current will pass through the first rectifying diode to charge the first power capacitor and to supply power to the light emitting diode, and such that, during each negative half cycle in the current source, current will pass through the second rectifying diode to charge the second power capacitor and to supply power to the light emitting diode. During each positive half cycle, the second power capacitor will discharge to supply power to the light emitting diode, while during each negative half cycle, the first power capacitor will discharge to supply power to the light emitting diode.

Instead of a single light emitting diode, the circuit may include a plurality of light emitting diodes connected in series between the first circuit portion and the second circuit portion. In a more particular embodiment, the sum of the turn-on voltages for the plurality of light emitting diodes is selected to be no more than the voltage supplied to the plurality of light emitting diodes by the circuit.

The drive circuits according to the present invention can be arranged in many different ways with many different components. Another alternating current drive circuit supplies power to first and second light emitting diodes and includes a current limiting capacitor for connection to the first terminal of a source of alternating current, with a first circuit portion connected between the current limiting capacitor and the second terminal of the source of alternating current, the first circuit portion including a first rectifying diode connected in series with a first power capacitor.

A second circuit portion is connected, in parallel with the first circuit portion, between the current limiting capacitor and the second terminal of the source of alternating current, the second circuit portion including a second rectifying diode connected in series with a second power capacitor. The first light emitting diode is connected in the first circuit portion and in parallel with the first power capacitor, while the second light emitting diode is connected, with opposite polarity to the first light emitting diode, in the second circuit portion and in parallel with the second power capacitor.

The first and second rectifying diodes are connected with opposite polarity such that, during each positive half cycle in the current source, current will pass through the first rectifying diode to charge the first power capacitor and to supply power to the first light emitting diode. During each negative half cycle in the current source, current will pass through the second rectifying diode to charge the second power capacitor and to supply power to the second light emitting diode. Moreover, during each positive half cycle, the second power capacitor discharges to supply power to the second light emitting diode and during each negative half cycle, the first power capacitor discharges to supply power to the first light emitting diode.

In a more particular embodiment, the first light emitting diode is increased to a first plurality of light emitting diodes connected in series in the first circuit portion and in parallel with the first power capacitor and the second light emitting diode is replaced with a second plurality of light emitting diodes connected in series in the second circuit portion and in parallel with the second power capacitor. The sum of the turn-on voltages for the first plurality of light emitting diodes is selected to be no more than the voltage supplied to the first plurality of light emitting diodes by the circuit and the sum of the turn-on voltages for the second plurality of light emitting diodes is selected to be no more than the voltage supplied to the second plurality of light emitting diodes by the circuit.

The present invention is described herein with reference to certain embodiments but it is understood that the invention can be embodied in many different forms and should not be construed as limited to the embodiments set forth herein. It is also understood that when an element or component is referred to as being "connected to" or "coupled to" another element or component, it can be directly connected to or coupled to the other element or component, or intervening elements may also be present.

Although the terms first, second, etc. may be used herein to describe various elements, components and/or sections, these elements, components, and/or sections should not be limited by these terms. These terms are only used to distinguish one element, component, or section from another. Thus, a first element, component, or section discussed below could be termed a second element, component, or section without departing from the teachings of the present invention.

One embodiment of the invention is depicted in FIG. 1, which is a schematic of an alternating current (AC) drive circuit for supplying power to a string of light emitting diodes (LEDs) 100, 102 and 104.

A current limiting capacitor 106 is connected to the first terminal 108 of a source of alternating current (AC) 110. The value of the capacitor 106 should be selected, taking into consideration the voltage and frequency of the AC source 110, as well as the turn-on voltages of the LEDs 100, 102 and 104, to optimize the current supplied to the LEDs.

A first circuit portion 112 is connected between the capacitor 106 and the second terminal 114 of the AC source 110. The circuit portion 112 includes a first rectifying diode 116, connected in series with a first power capacitor 118.

A second circuit portion 120, in parallel with the circuit portion 112, is also connected between the capacitor 106 and the terminal 114. The second circuit portion 120 includes a second rectifying diode 122, connected in series with a second power capacitor 124.

The LEDs 100, 102 and 104 are connected between the first circuit portion 112 and the second circuit portion 120, with the first and second diodes 116 and 122 connected with their polarities opposite. With this arrangement, during each positive half cycle supplied by the AC source 110, current will pass through the first diode 116 and then to the first power capacitor 118 and the LEDs 100-104, thereby charging the capacitor 118 while supplying power to cause the LEDs to emit light.

Similarly, during each negative half cycle supplied by the AC source, current will pass through the second diode 122 and on to the second power capacitor 124 and the LEDs 100-104, thereby charging the capacitor 124 while supplying power to cause the LEDs to emit light.

Moreover, during each positive half cycle of the power, the second power capacitor 124 will discharge to supply additional power to the light emitting diodes. Similarly, during each negative half cycle, the first power capacitor 118 will discharge to supply power to the light emitting diodes.

The values of the first and second power capacitors 118 and 124 should be selected to optimize the power supplied to the light emitting diodes by the first power capacitor during each negative half cycle and by the second power capacitor during each positive half cycle.

As those skilled in the art will appreciate, the number of light emitting diodes in the circuit can be adjusted, with as few as one LED, to suit the application and or the LEDs that are to be used. Whatever number of LEDs is used, the sum of the turn-on voltages for the series of LEDs should not exceed the voltage supplied to the LEDs by the circuit.

Figure 2:
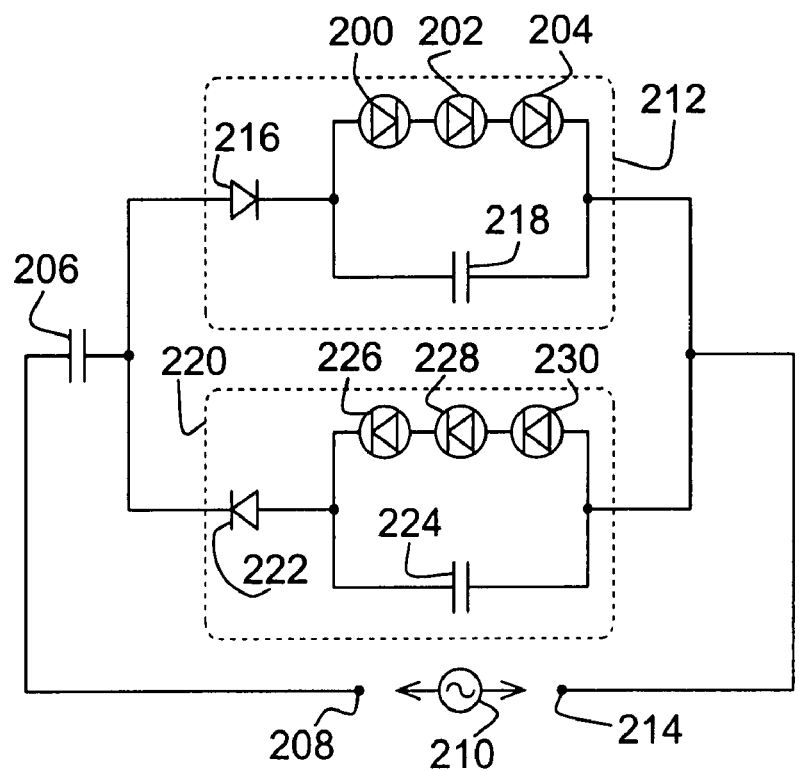
FIG. 2 is a schematic diagram, similar to FIG. 1, constructed according to a second embodiment of the invention, for supplying power to light emitting diodes.

A second embodiment of the invention is depicted in FIG. 2, which, similar to FIG. 1, is a schematic of an AC drive circuit for supplying power to LEDs. In this embodiment, however, the circuit is configured to supply power to a first string of LEDs 200, 202 and 204 as well as to a second string of LEDs 226, 228 and 230.

A current limiting capacitor 206 is connected to the first terminal 208 of a source of alternating current (AC) 210. The value of the capacitor 206 should be selected, taking into consideration the voltage and frequency of the AC source 210, as well as the turn-on voltages of the LEDs 200, 202, 204, 226, 228 and 230, to optimize the current supplied to the LEDs.

A first circuit portion 212 is connected between the capacitor 206 and the second terminal 214 of the AC source 210. The circuit portion 212 includes a first rectifying diode 216, connected in series with a first power capacitor 218.

A second circuit portion 220, in parallel with the first circuit portion 212, is also connected between the capacitor 206 and the terminal 214. The second circuit portion 220 includes a second rectifying diode 222, whose polarity is opposite to the polarity of the first rectifying diode 216, connected in series with a second power capacitor 224.

The first string of LEDs 200-204 is connected in the first circuit portion 212 and in parallel with the first power capacitor 218, while the second string of LEDs 226-230 is connected, with their polarities opposite to the polarities of the LEDs 200-204 in the first string, in the second circuit portion 220 and in parallel with the second power capacitor 224.

With this arrangement of the circuit elements, during each positive half cycle supplied by the AC source 210, current will pass through the first diode 216 and then to the first power capacitor 218 and the LEDs 200-204, thereby charging the capacitor 218 while supplying power to cause the LEDs to emit light.

Similarly, during each negative half cycle supplied by the AC source, current will pass through the second diode 222 and on to the second power capacitor 224 and the LEDs 226-230, thereby charging the capacitor 224 while supplying power to cause the LEDs to emit light.

Moreover, during each positive half cycle of the power, the second power capacitor 224 will discharge to supply additional power to the second string of light emitting diodes 226-230. Similarly, during each negative half cycle, the first power capacitor 218 will discharge to supply power to the first string of light emitting diodes 200-204.

The values of the first and second power capacitors 218 and 224 should be selected to optimize the power supplied to the light emitting diodes by the first power capacitor during each negative half cycle and by the second power capacitor during each positive half cycle.

As with the embodiment depicted in FIG. 1, the number of light emitting diodes in the circuit can be adjusted, with as few as one LED in each of the first and second strings, to suit the application and or the particular LEDs that are to be used. Whatever number of LEDs is used, the sum of the turn-on voltages for each string of LEDs should not exceed the voltage supplied to the string by the circuit.

The preferred embodiments of this invention have been illustrated and described above. Modifications and additional embodiments, however, will undoubtedly be apparent to those skilled in the art. It may be desirable, for example, to add components to the circuit to improve the power factor. Moreover, elements, such as fuses or thermistors, might be incorporated to provide in-rush current safety. It could also be advantageous to add components to filter high frequency noise, such as electromagnetic interference, from being emitted back into the power supply. Another additional feature, which may be desirable in some lighting applications, would be the provision of dimming capability for the LEDs.

Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The invention claimed is:

1. An alternating current drive circuit for supplying power to a light emitting diode, comprising:
    a first circuit portion connected to a source of alternating current, the first circuit portion including a first diode connected to a first capacitor; and
    a second circuit portion connected in parallel with the first circuit portion and to the source of alternating current, the second circuit portion including a second diode connected in series to a second capacitor, wherein the light emitting diode is connected between the first circuit portion and the second circuit portion.

2. The circuit of claim 1, wherein said source of alternating current comprises a first terminal and a second terminal, the first and second circuit portions connected between the first and second terminals.

3. The circuit of claim 2, further comprising a current limiting capacitor between the first terminal and the first and second circuit portions.

4. The circuit of claim 1, further comprising a current limiting capacitor.

5. The circuit of claim 3, wherein the value of the current limiting capacitor is selected, in conjunction with the voltage supplied by the source of alternating current, the frequency of the source of alternating current, and the turn-on voltage of the light emitting diode, to optimize the current supplied to the light emitting diode.

6. The circuit of claim 1, wherein said first and second diodes comprise rectifying diodes.

7. The circuit of claim 1, wherein said first and second diodes are connected in series with said first and second capacitors, respectively.

8. The circuit of claim 1, wherein the first and second diodes are connected with opposite polarity such that, during each positive half cycle in the current source, current passes through the first diode to charge the first capacitor and to supply power to the light emitting diode, and such that, during each negative half cycle in the current source, current passes through the second diode to charge the second capacitor and to supply power to the light emitting diode.

9. The circuit of claim 8, wherein during each positive half cycle, the second power capacitor discharges to supply power to the light emitting diode and during each negative half cycle, the first power capacitor discharges to supply power to the light emitting diode.

10. The circuit of claim 1, wherein the light emitting diode further comprises a plurality of light emitting diodes connected in series between the first circuit portion and the second circuit portion.

11. The circuit of claim 9, wherein the sum of the turn-on voltages for the plurality of light emitting diodes is selected to be no more than the voltage supplied to the plurality of light emitting diodes by the circuit.

12. The circuit of claim 1, wherein the values of the first and second capacitors are selected to optimize the power supplied to the light emitting diode by the first capacitor during each negative half cycle and by the second capacitor during each positive half cycle.

13. An alternating current drive circuit for supplying power to a plurality of light emitting diodes, comprising:
a current limiting capacitor for connection to the first terminal of a source of alternating current;
a first circuit portion connected between the current limiting capacitor and the second terminal of the source of alternating current, the first circuit portion including a first rectifying diode connected in series with a first power capacitor; and
a second circuit portion connected, in parallel with the first circuit portion, between the current limiting capacitor and the second terminal of the source of alternating current, the second circuit portion including a second rectifying diode connected in series with a second power capacitor, wherein the plurality of light emitting diodes being connected between the first circuit portion and the second circuit portion.

14. The circuit of claim 13, wherein the first and second rectifying diodes are connected with opposite polarity such that, during each positive half cycle in the current source, current will pass through the first rectifying diode to charge the first power capacitor and to supply power to the light emitting diodes, and such that, during each negative half cycle in the current source, current will pass through the second rectifying diode to charge the second power capacitor and to supply power to the light emitting diodes.

15. The circuit of claim 14, wherein during each positive half cycle, the second power capacitor discharges to supply power to the light emitting diodes and during each negative half cycle, the first power capacitor discharges to supply power to the light emitting diodes, the values of the first and second power capacitors being selected to optimize the power supplied to the light emitting diodes by the first power capacitor during each negative half cycle and by the second power capacitor during each positive half cycle.

16. An alternating current drive circuit for supplying power to first and second light emitting diodes, comprising:
a first circuit portion connected to a source of alternating current, the first circuit portion including a first diode connected with a first capacitor;
a second circuit portion connected, in parallel with the first circuit portion, to the source of alternating current, the second circuit portion including a second diode connected with a second power capacitor;
the first light emitting diode being connected in the first circuit portion and in parallel with the first capacitor; and
the second light emitting diode being connected, with opposite polarity to the first light emitting diode, in the second circuit portion and in parallel with the second capacitor.

17. The circuit of claim 16, wherein said source of alternating current comprises a first terminal and a second terminal, the first and second circuit portions connected between the first and second terminals.

18. The circuit of claim 16, further comprising a current limiting capacitor.

19. The circuit of claim 17, further comprising a current limiting capacitor between the first terminal and the first and second circuit portions.

20. The circuit of claim 16, wherein said first and second diodes comprise rectifying diodes.

21. The circuit of claim 16, wherein said first and second diodes are connected in series with said first and second capacitors, respectively.

22. The circuit of claim 16, wherein the first and second diodes are connected with opposite polarity such that, during each positive half cycle in the current source, current will pass through the first diode to charge the first capacitor and to supply power to the first light emitting diode, and during each negative half cycle in the current source, current will pass through the second diode to charge the second capacitor and to supply power to the second light emitting diode.

23. The circuit of claim 22, wherein during each positive half cycle, the second capacitor discharges to supply power to the second light emitting diode and such that, during each negative half cycle, the first power capacitor discharges to supply power to the first light emitting diode.

24. The circuit of claim 16, wherein:
the first light emitting diode further comprises a first plurality of light emitting diodes connected in series in the first circuit portion and in parallel with the first power capacitor; and
the second light emitting diode further comprises a second plurality of light emitting diodes connected in series in the second circuit portion and in parallel with the second power capacitor.

25. The circuit of claim 24, wherein:
the sum of the turn-on voltages for the first plurality of light emitting diodes is selected to be no more than the voltage supplied to the first plurality of light emitting diodes by the circuit; and
the sum of the turn-on voltages for the second plurality of light emitting diodes is selected to be no more than the voltage supplied to the second plurality of light emitting diodes by the circuit.

26. The circuit of claim 16, wherein the value of the current limiting capacitor is selected, in conjunction with the voltage supplied by the source of alternating current, the frequency of the source of alternating current, and the turn-on voltages of the first and second light emitting diodes, to optimize the currents supplied to the first and second light emitting diodes.

27. The circuit of claim 16, wherein the value of the first capacitor is selected to optimize the power supplied to the light emitting diode by the first capacitor during each negative half cycle and the value of the second capacitor is selected to optimize the power supplied to the light emitting diode by the first capacitor during each positive half cycle.

28. An alternating current drive circuit for supplying power to first and second pluralities of light emitting diodes, comprising:
   a current limiting capacitor for connection to the first terminal of a source of alternating current;
   a first circuit portion connected between the current limiting capacitor and the second terminal of the source of alternating current, the first circuit portion including a first rectifying diode connected in series with a first power capacitor;
   a second circuit portion connected, in parallel with the first circuit portion, between the current limiting capacitor and the second terminal of the source of alternating current, the second circuit portion including a second rectifying diode connected in series with a second power capacitor;
   the first plurality of light emitting diodes being connected in the first circuit portion and in parallel with the first power capacitor; and
   the second plurality of light emitting diodes being connected, with opposite polarity to the polarity of the first light emitting diodes, in the second circuit portion and in parallel with the second power capacitor.

29. The circuit of claim 28, wherein the first and second rectifying diodes are connected with opposite polarity such that, during each positive half cycle in the current source, current will pass through the first rectifying diode to charge the first power capacitor and to supply power to the first plurality of light emitting diodes, and such that, during each negative half cycle in the current source, current will pass through the second rectifying diode to charge the second power capacitor and to supply power to the second plurality of light emitting diodes.

30. The circuit of claim 29, wherein during each positive half cycle, the second power capacitor will discharge to supply power to the second plurality of light emitting diodes, the value of the second power capacitor being selected to optimize the power supplied to the second plurality of light emitting diodes by the second power capacitor during each positive half cycle, and such that, during each negative half cycle, the first power capacitor will discharge to supply power to the first plurality of light emitting diodes, the value of the first power capacitor being selected to optimize the power supplied to the first plurality of light emitting diodes by the first power capacitor during each negative half cycle.

* * * * *